UNITED STATES PATENT OFFICE.

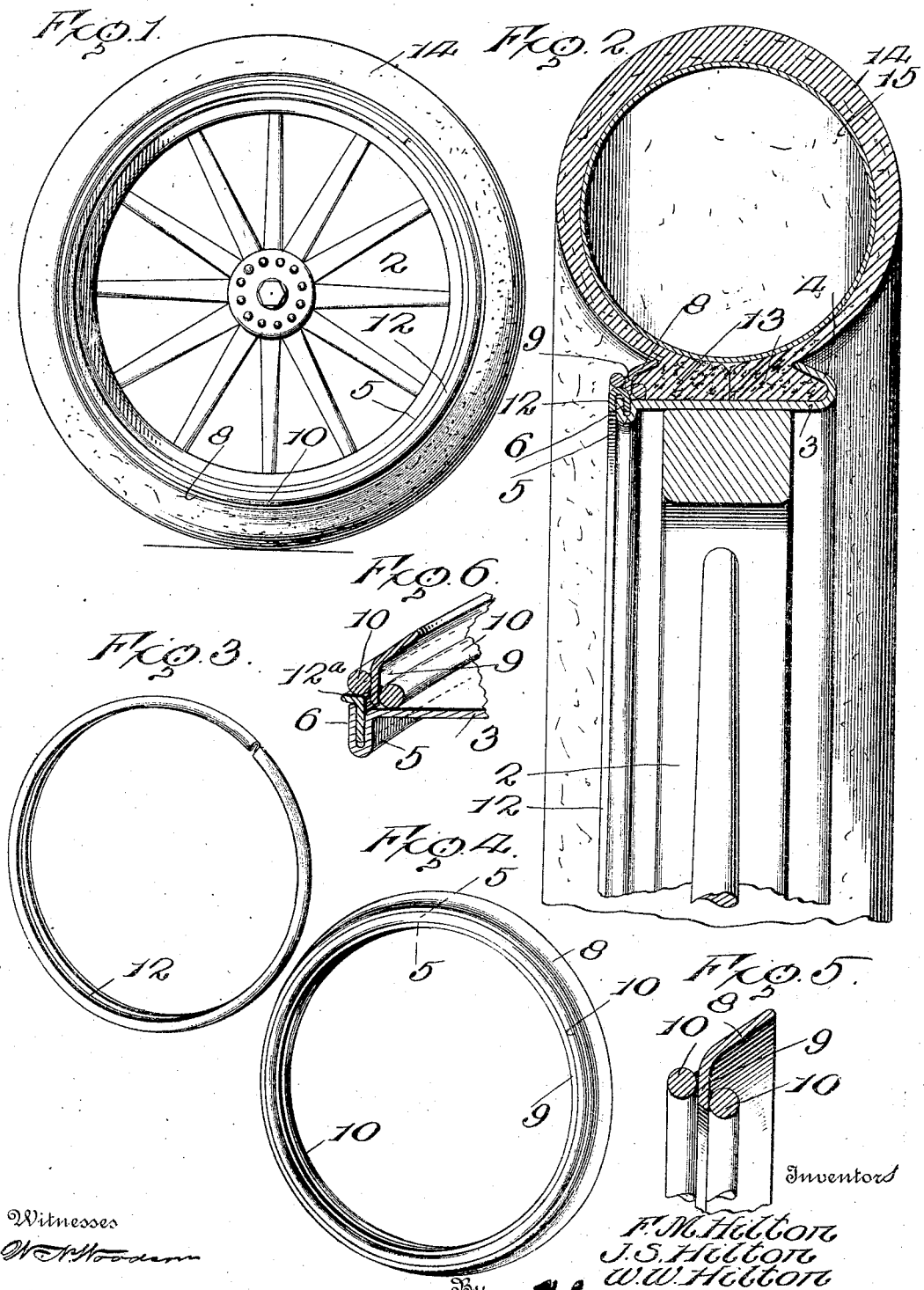

FRANK M. HILTON, JOHN S. HILTON, AND WILLIAM W. HILTON, OF AKRON, OHIO.

TIRE-CLAMP FOR VEHICLE-WHEELS.

1,011,345.  Specification of Letters Patent.  Patented Dec. 12, 1911.

Application filed March 2, 1910. Serial No. 546,907.

*To all whom it may concern:*

Be it known that we, FRANK M. HILTON, JOHN S. HILTON, and WILLIAM W. HILTON, citizens of the United States, residing at Akron, in the county of Summit and State of Ohio, have invented certain new and useful Improvements in Tire-Clamps for Vehicle-Wheels, of which the following is a specification.

Our invention relates to vehicle wheels such as are used for automobiles and other traction vehicles carrying rubber tires, and more particularly to that class of wheels in which the outer rubber tire is laterally slidable for disengagement from the rim, so that the tire as a whole may be slid from the rim or replaced thereon quickly and easily.

The object of our invention is to provide a very simple construction of this character, in which the rim is formed with a sliding annular section which is adapted to engage the outer or clencher rim of the tire and which is held in place by a locking member which not only locks the sliding ring or flange in place, but also acts to strengthen the rim of the wheel and prevent its being dented or deformed, this locking member having the form of a ring, U-shaped in cross section, very light in construction and not only acting to hold the sliding ring flange in place, but acting to strengthen the rim of the wheel itself.

A further object attained by the use of a U-shaped locking ring is that it permits the rim to be made with a deeper channel or groove at the margin thereof, in which the locking ring fits, thus preventing any chance of detachment of the locking ring as would take place were the channel or groove relatively shallow, and further permitting the easier detachment of the locking ring from its engagement with the channel.

Further objects of the invention will be pointed out in the course of the following description.

For a full understanding of the invention and the merits thereof, and to acquire a knowledge of the details of construction, reference is to be had to the following description and accompanying drawings, in which:

Figure 1 is a side elevation of a wheel constructed in accordance with our invention; Fig. 2 is an enlarged transverse section through the rim and tire of such a wheel; Fig. 3 is a perspective view of the locking ring; Fig. 4 is a perspective view of the tire-clamping ring; Fig. 5 is an enlarged section of the tire-clamping ring; and, Fig. 6 is a sectional perspective view of the margin of the rim, the clamping ring and a modified form of locking ring.

Corresponding and like parts are referred to in the following description and indicated in all the views of the drawings by the same reference characters.

Referring to these figures, 2 designates a vehicle wheel, the body of which has any suitable construction. 3 designates the rim therefor. This rim, as shown, comprises a cylindrical portion forming the rim proper, which on one edge is upwardly and inwardly turned or flanged, as at 4. The other margin of the rim is inwardly turned and then outwardly bent so that a U-shaped flange 5 is formed upon this margin of the rim, which flange extends inwardly entirely inside of the inner face of the rim proper. The outwardly turned margin 6 of the flange 5, it will be seen, does not project beyond the face of the rim, thus permitting the tire to be easily slid on and off the rim.

Loosely mounted upon the rim is the annular clamping member 8. This clamping member has the form of a ring, one margin of which is angularly disposed with relation to the main portion of the ring, this margin being designated by the numeral 9. On each side of the flanged margin 9 are placed the strengthening rings 10, these rings being formed integral with or attached to the clamping member. The clamping member is made of relatively thin metal, this metal being preferably circumferentially ribbed or corrugated, so as to strengthen it. It will be seen that the clamping member is complementary to the returned margin 4 and that the clencher tire is adapted to be clamped between this inwardly turned margin 4 and the clamping member 8. In order to hold the clamping member in place against the outward thrust of the expanded pneumatic tire, we provide the locking member 12. This member is preferably U-shaped in cross section, as shown in Fig. 3, as this form, while using a minimum of material, gives a maximum of strength. Furthermore, the U-shaped form of the member permits it to be placed over the edge of the outwardly turned margin 6 of the U-shaped flange 5. This member, when in position, locks the clamping ring 8 in place and prevents it from sliding laterally. Furthermore, it fills the space between the outwardly turned margin 6 and the body of the channel 5 so that the channel cannot be indented or crushed in. When the locking member 12 is in place, there will be a slight depression left between it and the rim 3. It will be seen that the flange 9 of the clamping ring 8 extends outward between the strengthening rings 10 and that this flange is therefore adapted to enter the space left between the locking ring 12 and the body of the ring, and that thus the clamping ring 8, when forced to its outermost position, snaps into place and is held from any inward or outward movement.

In the practical use of our invention, the locking ring and the clamping ring are both removed entirely from the rim. The clencher tire is then put on, one flange of the tire being inserted beneath the overturned margin 4. The clamping ring 8 is then placed on the rim, its body portion extending over the outwardly extending base flange 13 of the clencher tire 14 and then the locking ring 12 is sprung in place, straddling the outwardly turned portion or edge 6 of the rim. The interior rubber tire 15 is then inflated, which forces the clencher ring against the clamping ring 8 and forces said clamping ring laterally until stopped by contact with the ring 12. In this position it will be seen that the outer strengthening ring 10 extends over the locking ring 12 and holds it in position. By the reverse operation, the pneumatic outer tire may be easily removed from the rim.

While we prefer to use a locking ring which is U-shaped in cross section, as previously described, we do not wish to limit ourselves to this, as we may use the locking ring or band 12ª shown in Fig. 6. This band is angular in cross section and is designed to be used in precisely the same manner as the U-shaped ring previously described.

It will be seen that by the construction heretofore described, we have secured a rim one wall of which is readily detachable and may be removed and replaced with a minimum of effort, and further, that the pneumatic tire is locked in place after the tire has been inflated, each part protecting adjacent parts and locking them to the tire, the construction being so formed that the rim is reinforced at that portion of its circumference where it is most likely to come in contact with stones or obstructions and become indented or deformed. Further, the peculiar form of ring permits it to be inserted in a relatively deep groove from which it cannot be shifted except by expanding the ring and manually removing it, the outer margin of the ring which projects out of the groove or channel, permitting the easy removal of the ring, which would not be the case were the ring cylindrical in section, in which case it could not be easily removed from a deep channel.

Having thus described the invention, what is claimed as new is:—

A vehicle rim inturned at one edge and with a circumferential outwardly opening channel at the other edge, a tire having a clencher flange at one side engaging beneath the inturned edge of the rim and another flange at the opposite side provided with an annular recess, a clamping ring bearing over the recessed flange and provided with inwardly and outwardly directed ribs, the inwardly directed rib bearing in the recess of the tire flange, and an annular locking member bearing within the rim channel and likewise bearing beneath the outer rib of the clamping ring.

In testimony whereof we affix our signatures in presence of two witnesses.

FRANK M. HILTON. [L. S.]
JOHN S. HILTON.
WILLIAM W. HILTON.

Witnesses:
N. A. SPENCY,
OSBORN ERGATO.

---

Copies of this patent may be obtained for five cents each, by addressing the "Commissioner of Patents, Washington, D. C."